(12) United States Patent
Pintsov et al.

(10) Patent No.: US 6,920,438 B2
(45) Date of Patent: Jul. 19, 2005

(54) SYSTEM AND METHOD FOR EMPLOYING DIGITAL POSTAGE MARKS AS PART OF VALUE-ADDED SERVICES IN A MAILING SYSTEM

(75) Inventors: Leon A. Pintsov, West Hartford, CT (US); Theresa Biasi, Shelton, CT (US); Shirish S. Joshi, Fairfield, CT (US); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/385,094

(22) Filed: Mar. 10, 2003

(65) Prior Publication Data

US 2003/0144973 A1 Jul. 31, 2003

Related U.S. Application Data

(63) Continuation of application No. 09/339,768, filed on Jun. 24, 1999, now Pat. No. 6,532,452.

(51) Int. Cl.$^7$ ............................................. G06F 17/60
(52) U.S. Cl. .................. 705/401; 705/400; 705/402; 705/60; 705/404; 705/406; 705/410
(58) Field of Search .................... 705/60–62, 400–410, 705/50, 1

(56) References Cited

U.S. PATENT DOCUMENTS

| | | |
|---|---|---|
| 4,106,060 A | 8/1978 | Chapman, Jr. |
| 5,008,827 A | 4/1991 | Sansone et al. |
| 5,058,008 A | 10/1991 | Schumacher |
| 5,388,049 A | 2/1995 | Sansone et al. |
| 5,586,036 A * | 12/1996 | Pintsov ...................... 705/408 |
| 5,612,884 A | 3/1997 | Haines |
| 5,612,889 A | 3/1997 | Pintsov et al. |
| 5,648,916 A | 7/1997 | Manduley |
| 5,699,258 A | 12/1997 | Thiel |
| 5,712,712 A | 1/1998 | Sayward |
| 5,724,245 A | 3/1998 | Maher et al. |

(Continued)

FOREIGN PATENT DOCUMENTS

WO      99/21330      4/1999

OTHER PUBLICATIONS

"MySoftware Company and Stamps.com Announce Exclusive Partnership Designed To Deliver Itnernet Postage to Small Businesses", Jun. 21, 1999, PR Newswire.*
Peppriell, "The post office unveils the E–Stamp", May 1999, Searcher. Medford.*

Primary Examiner—James P. Trammell
Assistant Examiner—Jalatee Worjloh
(74) Attorney, Agent, or Firm—Charles R. Malandra, Jr.; Angelo N. Chaclas

(57) ABSTRACT

System and method for providing confirmation relating to the distribution of a mailpiece within a mailing system includes a determination of postal data required for postage evidencing of a mailpiece originated by a mailer. The postal data is combined with other data related to value-added services desired for the mailpiece. The value-added services data includes addressing information for a return receipt to the mailer. A digital postmark which includes the postal data and the value-added services data is created. At delivery of the mailpiece, the digital postmark is read and the value-added services data is captured from the read digital postmark. A confirmation message is sent to the mailer and/or other interested third parties, in accordance with information contained in the value-added services data.

14 Claims, 6 Drawing Sheets

U.S. PATENT DOCUMENTS

| | | |
|---|---|---|
| 5,726,894 A | 3/1998 | Sansone |
| 5,737,729 A | 4/1998 | Denman |
| 5,768,132 A | 6/1998 | Cordery et al. |
| 5,794,789 A | 8/1998 | Payson et al. |
| 5,805,810 A | 9/1998 | Maxwell |
| 5,826,034 A | 10/1998 | Albal |
| 5,859,967 A | 1/1999 | Kaufeld et al. |
| 5,875,302 A | 2/1999 | Obhan |
| 5,892,909 A | 4/1999 | Grasso et al. |
| 5,918,220 A | 6/1999 | Sansone et al. |
| 5,936,865 A | 8/1999 | Pintsov et al. |
| 5,953,427 A | 9/1999 | Cordery et al. |
| 5,978,781 A | 11/1999 | Sansone |
| 5,987,441 A | 11/1999 | Lee et al. |
| 6,014,688 A | 1/2000 | Venkatraman et al. |
| 6,018,774 A | 1/2000 | Mayle et al. |
| 6,032,138 A | 2/2000 | McFiggans et al. |
| 6,038,601 A | 3/2000 | Lambert et al. |
| 6,047,264 A | 4/2000 | Fisher et al. |
| 6,047,273 A | 4/2000 | Vaghi |
| 6,052,671 A | 4/2000 | Crooks et al. |
| 6,072,862 A | 6/2000 | Srinivasan |
| 6,101,487 A | 8/2000 | Yeung |
| 6,112,193 A | 8/2000 | Dlugos et al. |
| 6,216,127 B1 | 4/2001 | Gans et al. |
| 6,229,884 B1 | 5/2001 | Toyoda et al. |
| 6,233,317 B1 | 5/2001 | Homan et al. |
| 6,233,318 B1 | 5/2001 | Picard et al. |
| 6,289,323 B1 | 9/2001 | Gordon et al. |
| 2003/0105730 A1 * | 6/2003 | Rhoads et al. ............... 705/407 |

* cited by examiner

SYSTEM AND METHOD FOR EMPLOYING DIGITAL POSTAGE MARKS AS PART OF VALUE-ADDED SERVICES IN A MAILING SYSTEM

CROSS REFERENCE TO RELATED APPLICATIONS

This is a continuation application of application Ser. No. 09/339,768, filed on Jun. 24, 1999, now U.S. Pat. No. 6,532,452.

This application is related to U.S. patent application Ser. No. 09/339,769, filed on Jun. 24, 1999, now U.S. Pat. No. 6,463,354, and commonly assigned to the assignee of this application, which is specifically incorporated herein by reference.

FIELD OF THE INVENTION

The present invention relates generally to mailing systems and methods. More particularly, the present invention is directed to mailing systems and methods that evidence postage payment using digital postage marks.

BACKGROUND OF THE INVENTION

The field of communication is one of the fastest growing sectors of the economy. Communication enables business and economic transactions and fuels global economy. Two basic modes of communication are electronic and hardcopy communications. Well known examples of electronic communication are e-mail (Internet), computer facsimile and digital telephony, while a classic example of hardcopy communication is traditional mail delivery. There are also mixed forms of communication combining hardcopy and electronic modes such as traditional facsimile and hybrid mail. Both electronic and hardcopy communications offers advantages and disadvantages to users. The electronic communications while fast and economical lack universal coverage of traditional mail and create multiple security and legal concerns, particularly in sensitive transaction-type communications. The hardcopy mail is slower and more expensive, but covers a vast majority of the population and offers legal proof that is frequently required in business and social endeavors.

Recently, in the United States of America and other countries new digital methods of payment evidencing for traditional mail has been approved by respective Posts. Specifically, Digital Postage Marks (DPM) (a.k.a. digital indicia, a.k.a. information based indicia) are computerized information printed or otherwise attached to a mail item to provide an evidence of payment to a verification authority (e.g. the United States Postal Service). See for example, PERFORMANCE CRITERIA FOR INFORMATION-BASED INDICIA AND SECURITY ARCHITECTURE FOR OPEN IBI POSTAGE METERING SYSTEMS, dated Apr. 26, 1999, which is an United States Postal Service specification that defines the requirements for a system which uses a general purpose computer for printing information-based indicia in a 2-Dimensional barcode. When the majority of the information in the DPM is presented in the form of a 2-Dimensional barcode (such as DataMatrix or PDF417), the DPM can carry a very substantial amount of information that can be automatically and economically computerized, printed and later scanned using conventional computer-driven scanners. The nature of this information has been application dependent and has typically been oriented toward security features for verification of payment evidence. This type of information, generally referred to as postal data, preferably includes identification of the metering device (or licensee) responsible for the payment, unique identification of mail item, value of various accounting registers, location of the mail deposit/mailer's account, postage value and other similar information. Such information is typically protected by a cryptographically generated validation code known as CPVC (Cryptographic Postage Validation Code). Another way to protect DPM is by supplying the verification authority with the value of the validation code (Postage validation Code or PVC) prior to mail submission as described in U.S. Pat. No. 5,612,889, assigned to the assignee of this application.

One commonly recognized general purpose of sending a mail item is to solicit a reply message from a recipient or service provider. Such reply message may be a response to the message contained in the mail item or a service type message having to do with the fact of sending and/or delivering and/or receiving the mail item by either the mail recipient or the service provider or both. The situation when confirmation of mail acceptance and/or delivery is required is particularly common and normally addressed by certified, registered or insured mail. These types of mail are traditionally organized around a physical proof of acceptance and delivery, such as a physical receipt, which is signed by the service provider's clerks and/or the mail recipient and physically delivered to the mail originator (mailer). The postal services incur considerable cost for such value-added service, and the mailer is charged a fee that is significant in comparison to the cost of regular delivery of the mail item. For example, when a mailer requests a return receipt, the recipient of the mail signs a card stating that the mail has been received. This card is physically delivered back to the original mailer as acknowledgement of mail receipt from the recipient.

Such physical proofs of acceptance and delivery are economically inefficient and time-consuming. Most, if not all, of such methods require separate, essentially manual, handling of special services mail which is orders of magnitude more expensive than automated mail processing based on machine readability of information present on mail items.

As of 1998, almost 20% of the population in USA and industrial world in general have access to electronic mail via Internet. Even a higher number of mailers use facsimile regularly. These numbers are expected to grow dramatically in the future. Although such electronic communications provide speed and efficiency over the physical delivery of mail, there is no indication that such electronic communications will replace the physical delivery of mail. Heretofore, such electronic communications have been an alternative form of communication to the physical delivery of mail. The present invention provides an effective communication system that links the physical delivery of mail with electronic communications to optimize communications utilization of the advantages of each.

SUMMARY OF THE INVENTION

In accordance with the present invention, the machine-readable DPM provides a means to overcome the aforementioned difficulties at least for a considerable portion of mail stream. It has been found that the digital data in the DPM may include information that can be used for other than security and postage payment verification. For example, by including a mailer's e-mail address in the DPM, the present invention provides an opportunity to send a e-mail return receipt, which eliminates the need for a return receipt being physically delivered to the mailer. Thus, the postal service saves on the mail cost by adding this attribute to the DPM and the savings can be passed along to the mailer.

The present invention realizes that the new digital methods of payment evidencing offer unprecedented opportunities not only to improve postal revenue collection and protection but also to create new user friendly services that can greatly improve the appeal of traditional mail. Transition to digital methods of payment evidencing in fact offers an information-rich interface between mailers, posts and mail recipients that can substantially amplify advantages and features of traditional mail while simultaneously alleviating its disadvantages, such as its relatively high cost. Paradoxically, this information-rich interface can be achieved by integrating traditional hardcopy and electronic communication into one effective communication system that takes advantage of beneficial features of both media and offering end users (i.e. rate paying public) a broad selection of communication choices.

In accordance with the present invention, the DPM is treated as a message that is sent by a mailer to a service provider (carrier or Post), mail item recipient and any third party interested in the information encoded in the DPM (such as for example, a legal authority). In this regard, the DPM message can support any specific application of communication.

The present invention provides for the integration of electronic communication information, such as an e-mail address or a telephone, facsimile or pager number, into a conventional DPM. This allows the automatic creation and forwarding of service messages (such as delivery confirmation) to the mailer (or other intended recipient of the electronic communication) in a more expeditious and effective manner. Essentially, any information about a mail item known to the carrier can be forwarded to the mailer (or other intended recipient) through an alternative electronic communication channel. This concept can be extended even to the mail item communication message, which unlike DPM is hidden from the carrier. In particular, a digest of a mail item communication message (e.g. hash value) can be included into DPM as an evidence of the nature of delivered message. Through use of well-known security techniques, such as cryptography, the present invention deals effectively with issues of confidentiality, message integrity, authentication and non-repudiation. These and other aspects of the present invention are covered in the detailed description of the invention.

In accordance with the present invention, system and method for providing confirmation relating to the distribution of a mailpiece within a mailing system includes a determination of postal data required for postage evidencing of a mailpiece originated by a mailer. The postal data is combined with other data related to value-added services desired for the mailpiece. The value-added services data includes addressing information for a return receipt to the mailer. A digital postmark which includes the postal data and the value-added services data is created. At delivery of the mailpiece, the digital postmark is read and the value-added services data is captured from the read digital postmark. A confirmation message is sent to the mailer and/or other interested third parties, in accordance with information contained in the value-added services data.

Therefore, it is now apparent that the present invention substantially overcomes the disadvantages associated with the prior art. Additional advantages of the invention will be set forth in the description, which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

The present invention provides a system and method for integrating value-added services information into the DPM of a mail item to provide a more economical and efficient method of providing such value-added services. Although the present invention is described below as an e-mail implementation, it will be understood by those skilled in the art that a viable alternative includes substituting a mailer's pager number so that a pager notification of mail receipt can be used along with some other receipt data. Other viable alternatives include facsimile or automated voice response notification. Furthermore, the present invention is described for a mail item that is delivered by a postal service. It will be understood by those skilled in the art that the present invention can be used with any carrier that physically delivers any item. It will be further understood that for such other carriers, the communication information that is described herein as being integrated in the DPM, may be applied in any manner to any part of the item being physically delivered. For example, the information may be part of a bar code or may be in plain text.

Figure 1:
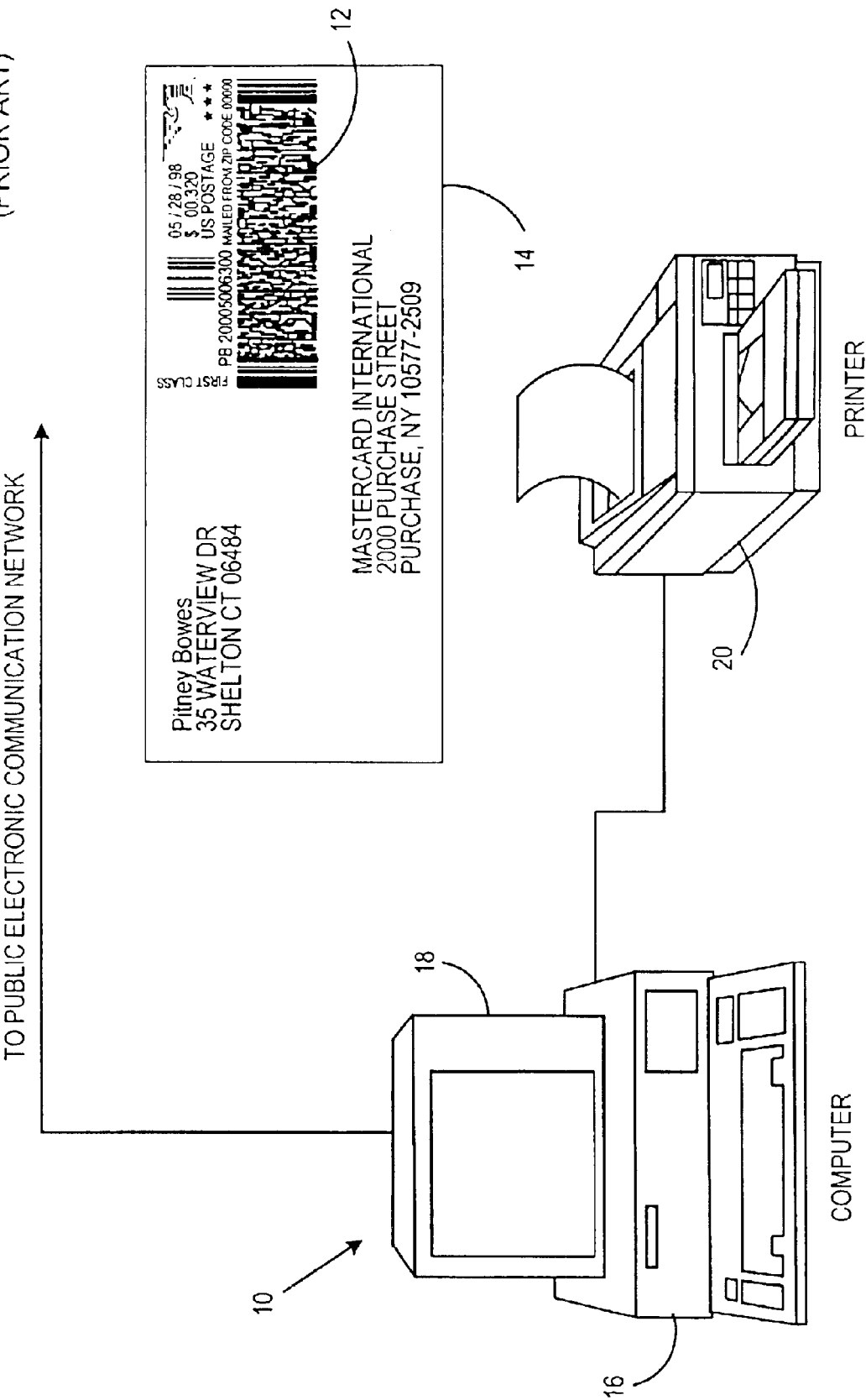
FIG. 1 is a schematic of a prior art PC metering system as an example of a mail generation subsystem that creates and prints a DPM in accordance with the present invention.

Referring now to FIG. 1, a schematic of a prior art PC metering system, generally designated 10, is shown as an example of a mail generation system that creates and prints a DPM 12 on mail item 14 in accordance with the present invention. In accordance with the present invention, DPM 12 includes a 2-Dimensional bar code that contains conventional IBIP information and confirmation notification information, such as e-mail address, facsimile number, telephone number and/or pager number, and a mail item unique identification number. PC meter 10 includes conventional PC 16, display 18 and printer 20. See U.S. Pat. No. 5,781, 438, assigned to the assignee of this application, which is hereby incorporated by reference for a more detailed description of a PC metering system.

Figure 2:
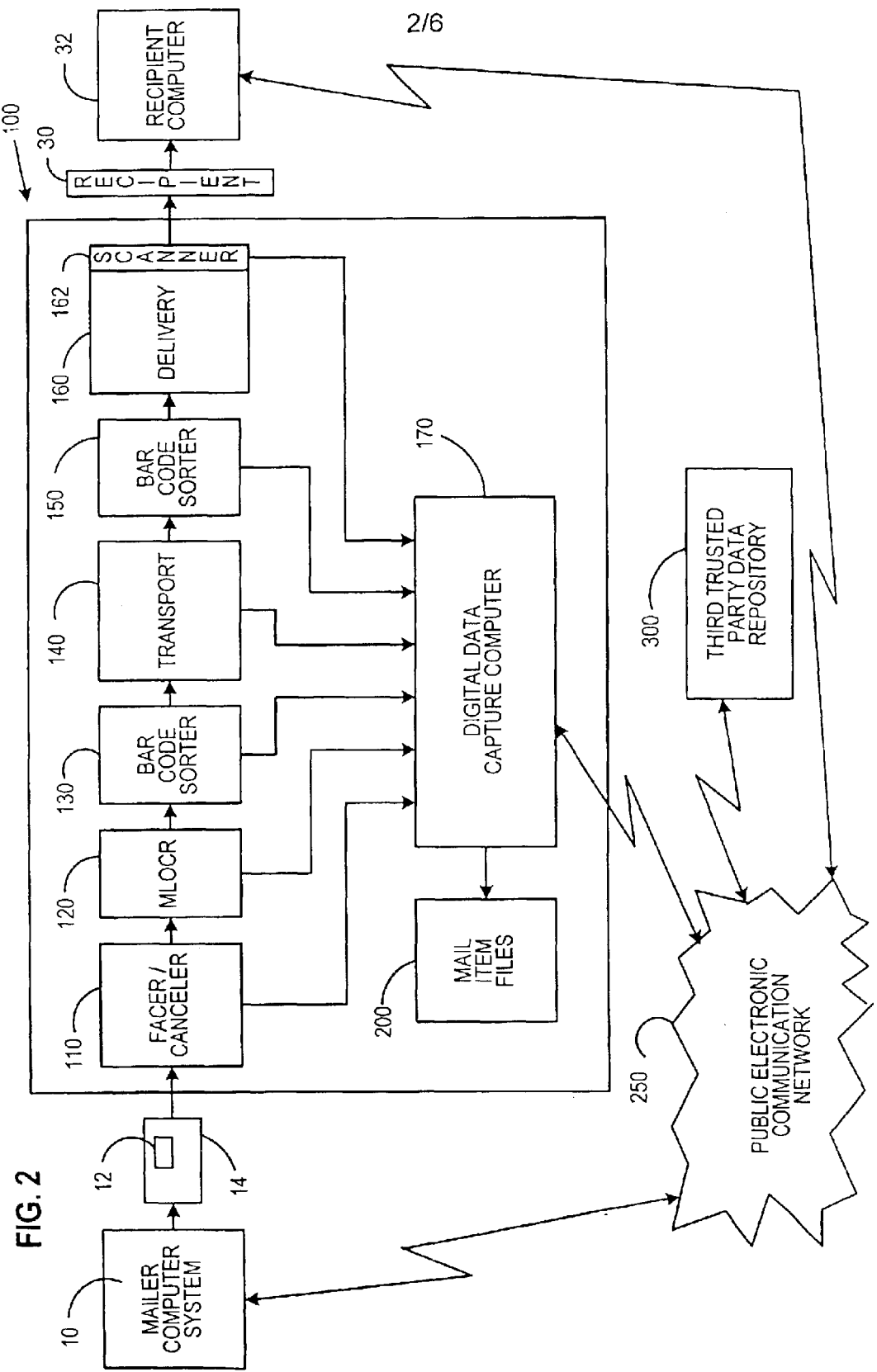
FIG. 2 is a block diagram of a postal distribution network in accordance with the present invention.

Referring now to FIG. 2, a block diagram of the system of the present invention is shown. The system includes a postal distribution network, generally designated 100, which processes a mail item 14 that originated from mailer's PC computer system 10 and delivers mail item 14 to a recipient 30 while capturing value-added services information in accordance with the present invention. The postal distribution network 100 includes conventional components such as: facer/canceler 110; MLOCR (multi-line optical character reader) sorters 120 that typically perform a primary sort for mail items that have not been presorted; intermediate barcode sorters 130, postal transport means 140 for transporting the mail item from one postal facility to another; final bar code sorters 150; and delivery means 160, such as a mail carrier delivery to a mailbox. Delivery means 160 includes a scanner 162 for scanning DPM 12 at the time of delivery. In accordance with the present invention, postal distribution network 100 further includes a digital data capture computer 170 that is optionally coupled to one or more of the aforementioned components of the postal distribution network 100 for the purpose of capturing information, including value-added services information, that is read from the DPM of the mail item being processed. As information is captured by digital data capture computer 170, a mail item file 200 (described in detail below) is created. Depending on the value-added services being processed, digital data capture computer 170 communicates through a public electronic communications network 250 with mailer's computer system 10, recipient's computer 32 or a third party computer 300. Communications network 250 may be any conventional communications network, such as the Internet or a cellular/conventional telephonic network, or any combination thereof depending on the type of communication information read from the DPM.

Figure 3:
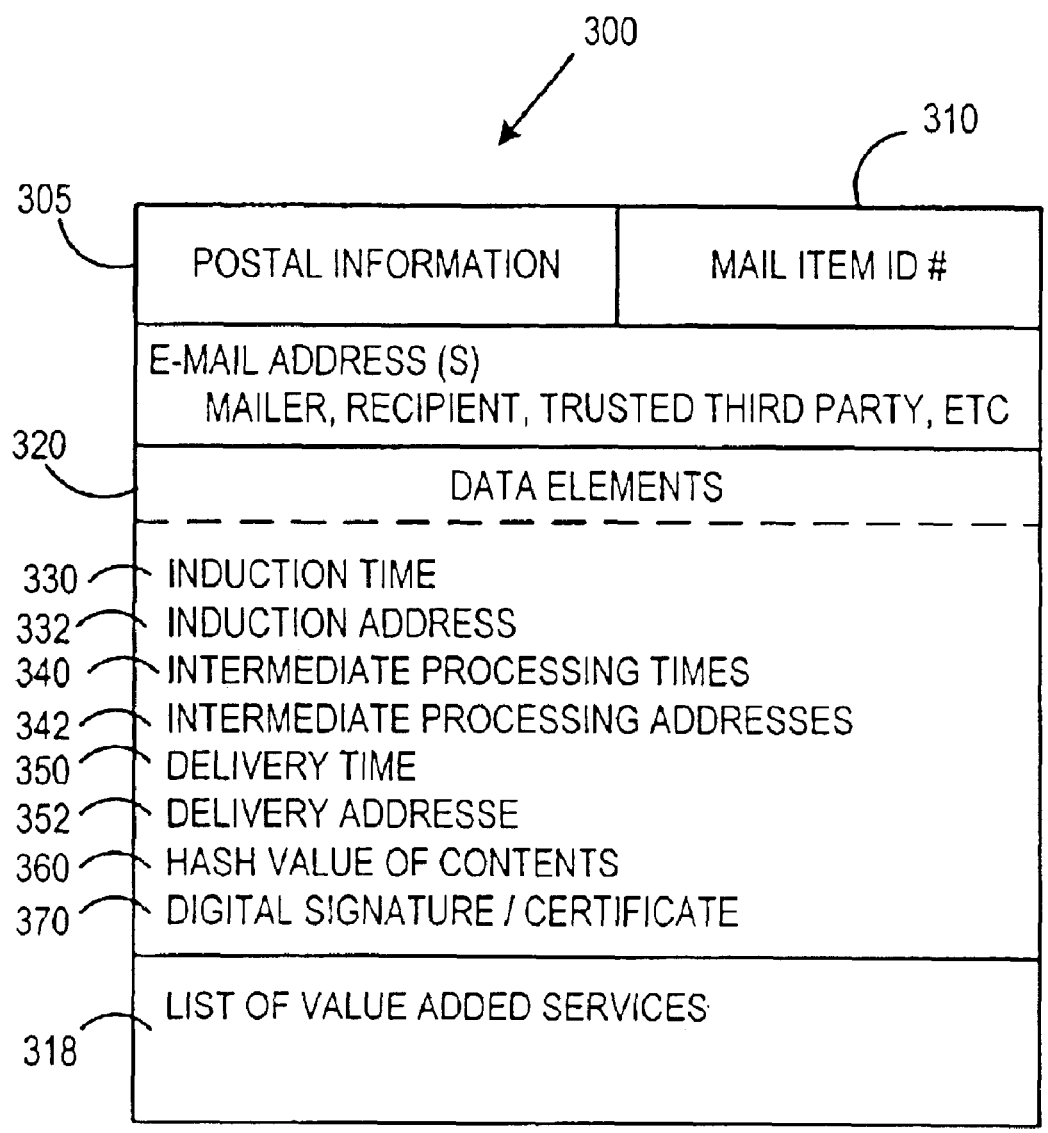
FIG. 3 is a block representation of a mail item file that is created and supplemented as the mail item is processed and delivered in accordance with the present invention.

Referring now to FIG. 3, a block representation of mail item file 300 that is created and supplemented as mail item 14 is processed and delivered to recipient 30. Mail item file 300 includes: a header 305 of postal information that has been captured from an initial read of the DPM; a mail item identification number 310, which has been read from the DPM or assigned within the postal distribution network 100; a list 318 of value-added services requested; and one or more e-mail addresses 320. For example, the value-added services may direct a communication to the mailer, the recipient, a third party repository or any other party. The present invention provides for one or more of such communications. Mail item file 300 further includes various data elements 320 that are optionally captured depending on the value-added services requested. Data elements 320 may include induction time 330 and induction address 332 indicating when and where mail item 14 enters the postal distribution network 100, intermediate times 340 and addresses 342 indicating various stages of processing within the postal distribution network 100, and delivery time 350 and delivery address 352 indicating when and where the mail item leaves the postal distribution network 100. Data elements 320 may further include information captured when the DPM 12 was read, such as a hash 360 of the contents of mail item 14 and a digital signature and/or certificate 370.

Figure 4:
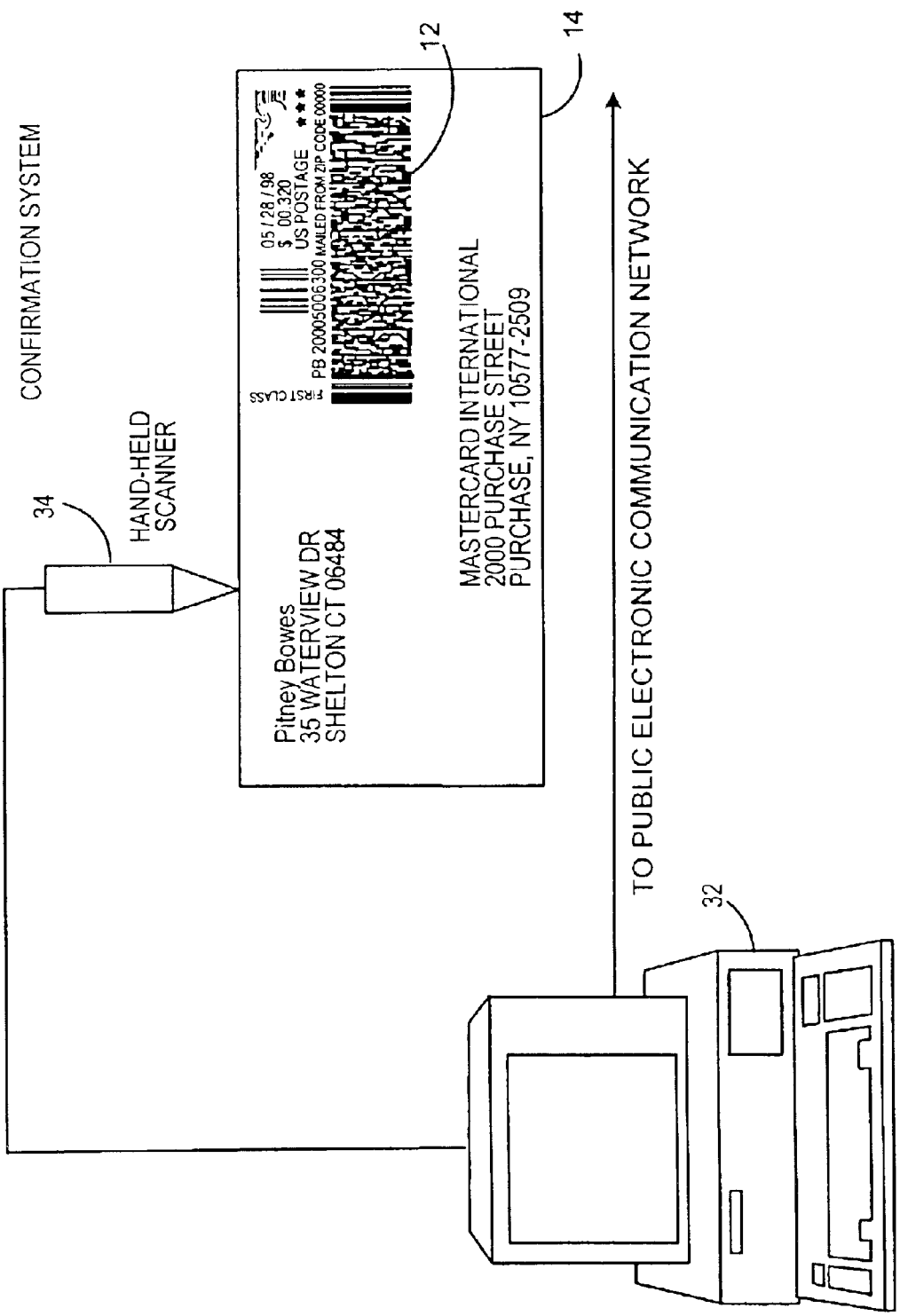
FIG. 4 is a schematic of an optional delivery confirmation subsystem used by a recipient in accordance with the present invention.

Referring now to FIG. 4, an optional delivery confirmation subsystem is shown in the form of recipient's computer 32. A hand-held scanner 34 is used by recipient 30 to read DPM 12. Recipient's computer 32 includes software, which obtains an appropriate e-mail address from DPM 12 and sends an e-mail response in accordance with information contained within DPM 12.

Figure 5:
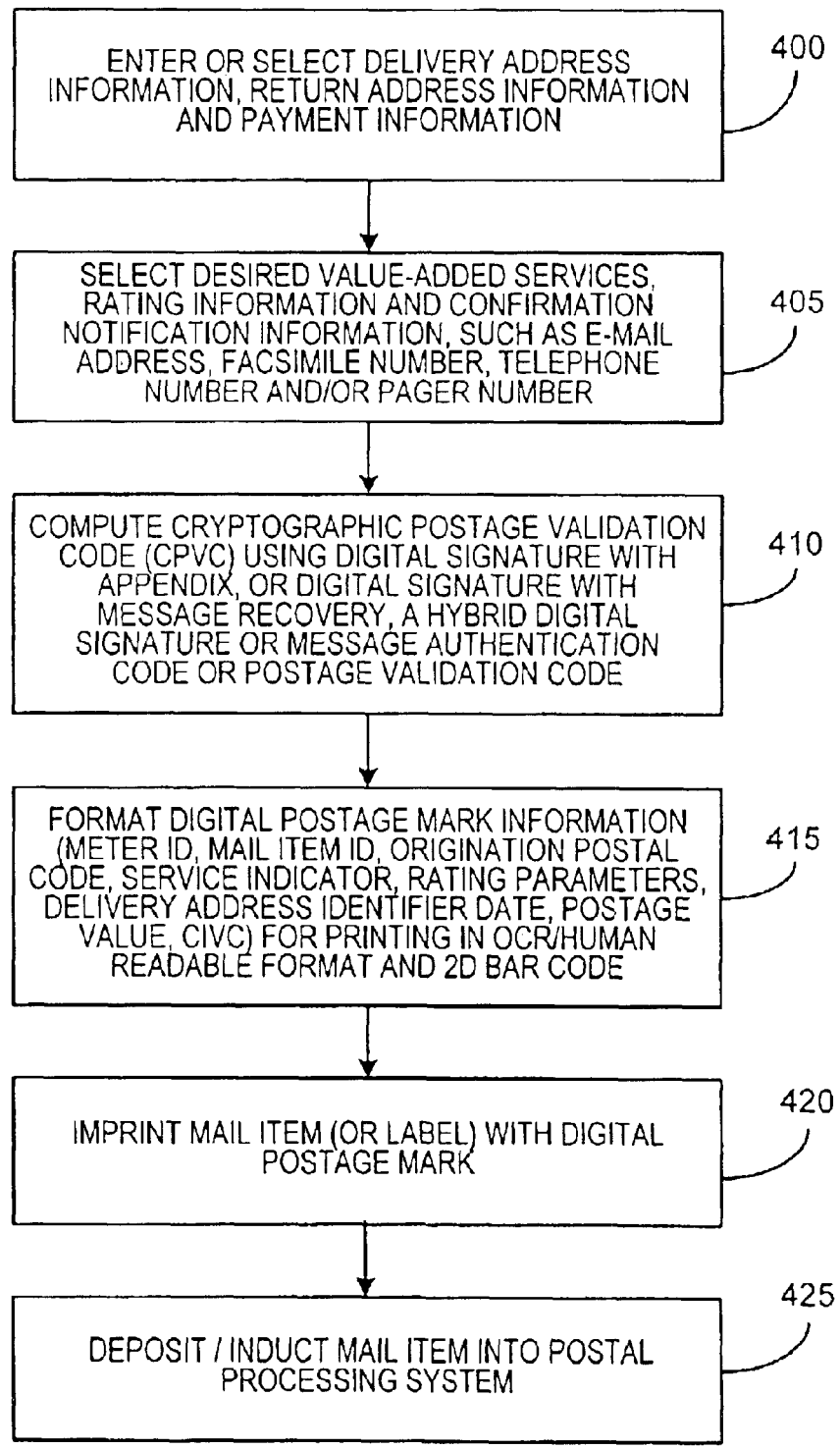
FIG. 5 is a flow chart of the process of creating the mail item to be processed by the postal distribution network of FIG. 2.

Referring now to FIG. 5, a process is shown for creating mail item 14 to be processed by the postal distribution network 100 in accordance with the present invention. Mail item 14 is created with a DPM mark that includes the mailer's e-mail address that will be used, for example, as confirmation or completion of value-added services requested by the mailer. Additional e-mail addresses may be included for other parties that the mailer desires to receive notice of, for example, delivery. DPM generation and/or postage payment process involves a user-selectable option to include e-mail address in encrypted form within the DPM. At step 400, using mail creation software in PC 16, a mailer enters or selects delivery address information, return address information and payment information. At step 405, the mailer selects desired value-added services, rating information and confirmation notification information, such as e-mail address, facsimile number, telephone number and/or pager number. It will be understood that the e-mail address may be automatically retrieved when the value-added services are selected. It will also be understood that the fee associated with the selected value-added services will be accounted for accordingly. At step 410, a cryptographic postage validation code (CPVC) is computed, for example, using digital signature with appendix, or digital signature with message recovery, a hybrid digital signature or message authentication code or postage validation code. At step 415, DPM 12 (including meter ID, mail item ID, origination postal code, service indicator, rating parameters, delivery address identifier date, postage value and CPVC) is formatted for printing in OCR/human readable format and 2-D bar code. At step 420, mail Item 14 is printed by printer 20 with DPM 12. At step 425, mail item 14 is deposited into the postal distribution network 100.

Figure 6:
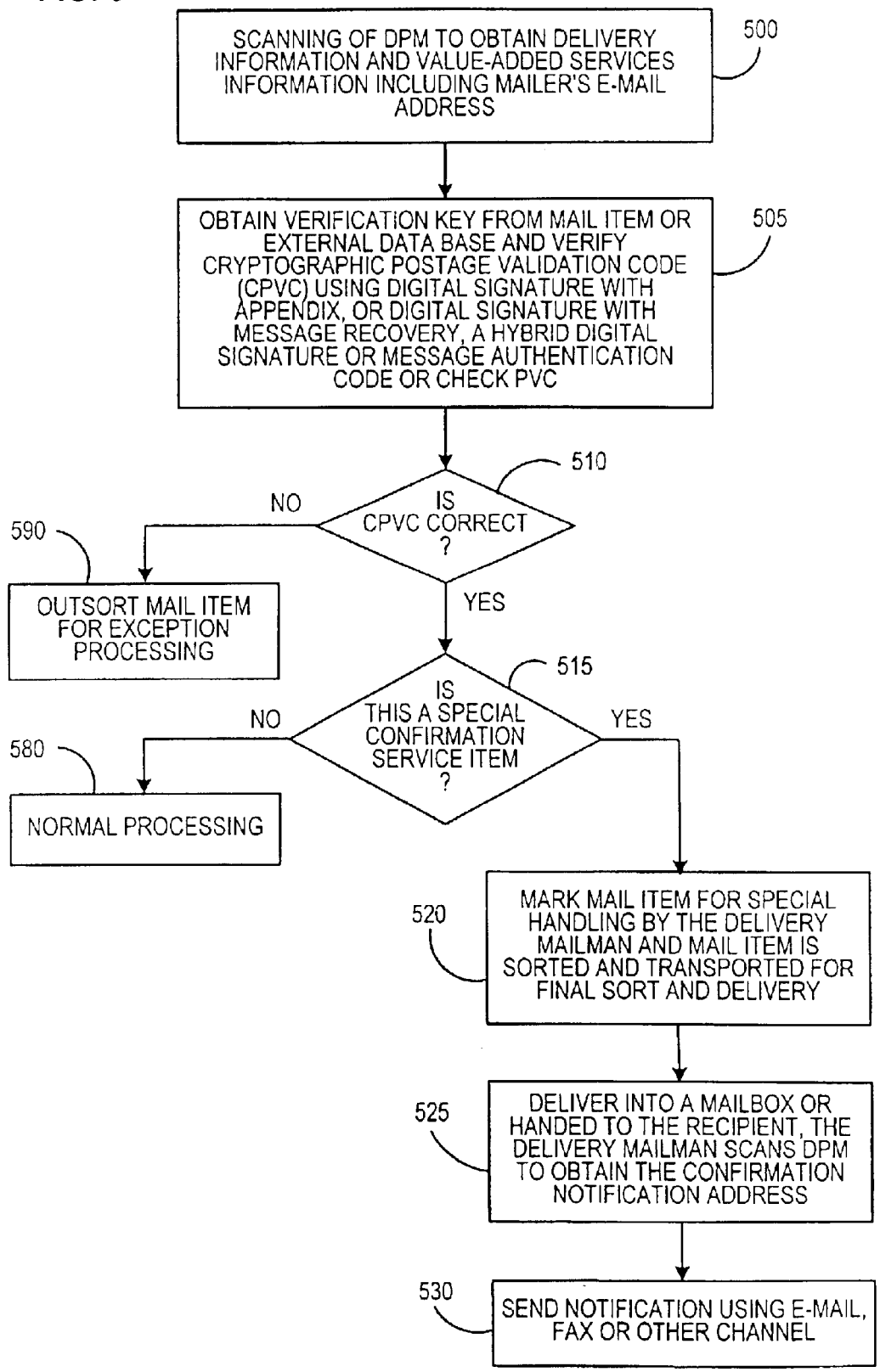
FIG. 6 is a flow chart of the processing of the mail item by the postal distribution network of FIG. 2.

Referring now to FIG. 6, a flow chart of the processing of mail item 14 by postal distribution network 100. At step 500, the processing of mail item 14 begins with the scanning of DPM 12, which provides delivery information and value-added services information including mailer's e-mail address. At step 505, a verification key is obtained from DPM 12 or an external database and the CPVC is verified using digital signature with appendix, or digital signature with message recovery, a hybrid digital signature or message authentication code or postage validation code. At step 510, if the CPVC is not correct, then at step 590 mail item 14 is outsorted. If the CPVC is correct, then a check is made at step 515 to determine whether confirmation of value-added services has been requested. If not, then normal processing continues at step 580. If confirmation of value-added services has been requested, then at step 520, mail item 14 is marked for special handling by the delivery mailman and mail item 14 is sorted and transported for final sort and delivery. At step 525, when mail item 14 is delivered into a mailbox or handed to the recipient, the delivery mailman scans DPM 12 to obtain the confirmation notification address. Alternatively, or additionally the recipient may scan DPM 12 to obtain the confirmation notification address for sending the notification or an additional related message. At step 530, notification is sent using the e-mail address(es) read from DPM 12.

In an alternate embodiment mail item 14 is entered into the mail stream in the usual manner and is delivered to the recipient through the normal postal process. Upon receipt of mail, either the recipient signs on electronic pad carried by the delivery person or receipt is noted by the delivery person using an electronic data collection device. The mailer, or any other interested party, can get return receipt in one of the following four ways or any combination thereof:

1) Printed version of electronic receipt mailed to mailer.
2) By an e-mail notification from the postal service informing the mailer of the delivery and mailing the recipient signature in a secure manner.
3) By visiting a secure web site created by the postal service and checking the receipt information like signature, time, date, etc.
4) By visiting a public web site created by the postal service to check a like of mail piece identification numbers that have been delivered.

It has been found that the present invention is symmetrical in that the initial message may be an e-mail and the response may by the physical delivery of the mail item 14 which references in DPM 12 the e-mail message. For example, a contract offer may be sent by e-mail with a condition that the recipient responds with a signed document within 24 hours of receipt of the e-mail. The recipient can respond and include the e-mail message identification and time of receipt in DPM 12 to accept the offer.

Many features of the embodiments disclosed herein represent design choices selected to exploit the inventive concept as implemented in a particular mailing system environment. However, those skilled in the art will recognize that various modifications can be made without departing from the spirit of the present invention. Therefore, the inventive concept in its broader aspects is not limited to the specific details of the preferred embodiments described above, but is defined by the appended claims and their equivalents.

What is claimed is:

1. A method for providing value added services relating to the distribution of a mailpiece within a mailing system, the method comprising the steps of:
   a) creating a set of data in response to a request for a value added service, said set of data including an electronic communication location identifier;
   b) printing said set of data into a predetermined location on said mailpiece;
   c) associating a value added service request identifier with said request for said value added service;
   d) printing said value added service request identifier on the mailpiece;
   e) reading said value added service request identifier to determine the value added service requested;
   f) obtaining from said predetermined location on said mailpiece said set of data; and
   g) performing said value added service by sending an electronic communication to the electronic communication location identifier obtained from the mailpiece.

2. The method as claimed in claim 1 wherein said predetermined location is within a digital postmark.

3. The method as claimed in claim 1 wherein said electronic communication location identifier is an e-mail address.

4. The method as claimed in claim 1 wherein said electronic communication location identifier is a telephone number.

5. The method as claimed in claim 1 wherein said electronic communication location identifier is a pager number.

6. The method as claimed in claim 1 wherein said electronic communication location identifier is a facsimile number.

7. The method as claimed in claim 1 wherein said value added service is an electronic confirmation of receipt of said mailpiece.

8. A method for providing confirmation relating to the distribution of mailpieces within a mailing system, the method comprising:
   reading the digital postmark off a physical mailpiece when the physical mailpiece is delivered, the digital postmark including value added services data, the value added services data including addressing information for a return receipt to the mailer;
   capturing the value added services data from the read digital postmark; and
   sending a return receipt message to the mailer in accordance with the addressing information.

9. The method as recited in claim 8 wherein the addressing information is an electronic communication location identifier.

10. The method as recited in claim 9 wherein the electronic communication location identifier is one of an e-mail address, a telephone number, a pager number and a facsimile number.

11. A computer program product on a computer readable medium for use in a processor based mailing system for providing value added services relating to the distribution of a mailpiece within a mailing system, the computer program product comprising:
    instructions for reading a value added service request identifier to determine the value added service requested;
    instructions for obtaining from a predetermined location on said mailpiece a set of data in response to a request for a value added service, the set of data including an electronic communication location identifier; and
    instructions for performing the value added service by sending an electronic communication to the electronic communication location identifier obtained from the mailpiece.

12. The computer product of claim 11 wherein the electronic communication location identifier is one of an e-mail address, a telephone number, a pager number and a facsimile number.

13. The computer product of claim 12 wherein the predetermined location on the mailpiece is a digital postmark for the mailpiece.

14. A computer-readable medium having computer-executable instructions for performing the method of claim 1.

* * * * *